US010088576B2

(12) United States Patent
Vasilyuk et al.

(10) Patent No.: US 10,088,576 B2
(45) Date of Patent: Oct. 2, 2018

(54) GNSS ANTENNA WITH AN INTEGRATED ANTENNA ELEMENT AND ADDITIONAL INFORMATION SOURCES

(71) Applicant: LIMITED LIABILITY COMPANY "TOPCON POSITIONING SYSTEMS", Moscow (RU)

(72) Inventors: Nikolai Nikolaevich Vasilyuk, Moskovskaya obl. (RU); Sergey Ivanovich Tychinskiy, Moscow (RU); Alexandr Vladimirovich Doronin, Moskovskaya obl. (RU); Igor Arkadievich Sandler, Moscow (RU); Andrey Mikhailovich Sokolov, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

(21) Appl. No.: 15/745,456

(22) PCT Filed: Apr. 27, 2016

(86) PCT No.: PCT/RU2016/000250
§ 371 (c)(1),
(2) Date: Jan. 17, 2018

(87) PCT Pub. No.: WO2017/188836
PCT Pub. Date: Nov. 2, 2017

(65) Prior Publication Data
US 2018/0217270 A1    Aug. 2, 2018

(51) Int. Cl.
*G01S 19/49* (2010.01)
*G01S 19/42* (2010.01)
*G01S 19/48* (2010.01)
*G01C 17/02* (2006.01)
*G01W 1/02* (2006.01)

(52) U.S. Cl.
CPC .............. *G01S 19/49* (2013.01); *G01C 17/02* (2013.01); *G01W 1/02* (2013.01)

(58) Field of Classification Search
CPC ........ G01C 21/165; G01S 19/48; G01S 19/49
USPC ............ 342/357.25, 357.29, 357.31, 357.32; 701/468, 470, 500
See application file for complete search history.

(56) References Cited

U.S. PATENT DOCUMENTS

| 5,420,592 A | 5/1995 | Johnson et al. |
| 7,212,921 B2 | 5/2007 | Jeerage et al. |
| 8,446,984 B2 | 5/2013 | Kelin et al. |
| 2002/0030625 A1 | 3/2002 | Cavallaro et al. |

(Continued)

FOREIGN PATENT DOCUMENTS

| CN | 101765787 A | 6/2010 |
| CN | 102590842 B | 4/2014 |

OTHER PUBLICATIONS

International Search Report and Written Opinion dated Feb. 2, 2017, in connection with International Patent Application No. PCT/RU2016/000250, 6 pgs.

*Primary Examiner* — Dao Linda Phan
(74) *Attorney, Agent, or Firm* — Chiesa Shahinian & Giantomasi PC (57) ABSTRACT

An improved GNSS antenna having an integrated antenna element in combination with a plurality of built-in sources of additional data and/or a plurality of devices for receiving additional information for exchanging the information and transmission of GNSS signals from the antenna element to a GNSS receiver over a single RF cable.

27 Claims, 5 Drawing Sheets

(56) References Cited

U.S. PATENT DOCUMENTS

2006/0208943 A1  9/2006  Gronemeyer
2008/0297407 A1  12/2008  Fenton
2011/0285584 A1  11/2011  Le Sage

GNSS ANTENNA WITH AN INTEGRATED ANTENNA ELEMENT AND ADDITIONAL INFORMATION SOURCES

CROSS-REFERENCE TO RELATED APPLICATIONS

This application is a national stage (under 35 U.S.C. 371) of International Patent Application No. PCT/RU2016/000250, filed Apr. 27, 2016, which is herein incorporated by reference in its entirety.

TECHNICAL FIELD

The present invention relates generally to Global Navigation Satellite System (GNSS) antenna design and, more particularly, to a GNSS antenna having an integrated antenna element in combination with a plurality of built-in sources and receivers of additional information for exchanging the information and transmission of GNSS signals from the antenna element to a receiver over a single RF cable.

BACKGROUND

A satellite navigation receiver can obtain a navigation solution (i.e., positioning information) provided that the receiver has reliable signal reception from a number of GNSS satellites to which the receiver is in contact. Reliable signal reception it typically enabled only under certain operating conditions, that is, an open sky environment when there are no obstacles to radio signals propagating from selected navigation satellites to the receiver's antenna. Any antenna blockage by natural or artificial obstacles (e.g., high trees with dense foliage, vertical walls of buildings, bridges, urban canyons, and structural elements of moving vehicles with a mounted GNSS antenna, and so on) will deteriorate the quality of signal reception. As such, the accuracy of these navigation solutions may suffer greatly including a full loss of the ability to accurately provide GNSS positioning in any way. If a GNSS receiver is integrated in a vehicle control system, even short-term GNSS positioning accuracy loss can result in a complete failure of the vehicle's control system and be unacceptable from at least a vehicle and/or human operator safety perspective.

A GNSS receiver with a single antenna measures coordinates and velocity vector components (to the extent the antenna is in motion) only for a single conditional point, the so-called antenna phase center (PC). If the GNSS antenna is fixed onto a body of a movable object, the measured coordinates and PC velocity are taken as coordinates and velocity of this movable object. As such, given the singular nature of the data, any orientation measurements of the movable object using a single antenna GNSS receiver is impossible given the need for multiple coordinates (e.g., roll, yaw, pitch, etc.) to determine orientation.

To determine vehicle orientation using a GNSS system, two or more antennas should be placed at different points on the vehicle body to measure their coordinates (one relative to the other) in the vehicle's body coordinate frame. In this way, orientation parameters can be calculated from simultaneous PC coordinate measurements of using a single-antenna (or one multi-antenna arrangement) GNSS receiver. It should be noted that two antennas allow a further determination to be made with respect to the vehicle's attitude (i.e., up to one turn about the baseline—a line connecting the PC of both antennas). Further, full orientation of the vehicle in the GNSS system can be determined by three or more spaced antennas.

A well-known method of avoiding short-term interruptions in the quality of navigation solutions is the multiplexing of a GNSS receiver and an inertial navigation system (INS). As will be appreciated, INS is capable of measuring coordinates, velocity and orientation of a vehicle irrespective of the availability (or unavailability) of any external information. However, errors with INS-only measurements tend to continuously grow (e.g., increasing drift), and INS navigational data is typically used in a motion control system only during a limited time period. A joint use of GNSS and INS allows for the correction of INS accumulated errors over all measured parameters (i.e., coordinates, velocity vector components, and orientation parameters). In this GNSS-INS joint operation, GNSS measurements are used for the elimination of potentially continuously growing INS errors for those vehicle trajectory paths for which GNSS solutions are fully accessible. During these paths, the INS solution typically has acceptable errors and needs no additional correction. At the beginning of the trajectory paths where there exist poor GNSS conditions (i.e., the GNSS solution itself is unacceptable) or has short-time accuracy degradation, the INS solution will still have acceptable errors with these errors most likely increasing over time. If the GNSS interruption is short in relation to the INS error growth the INS-only solution may be used to continue the entire navigation solution over this short time GNSS degradation interval. In addition, a continuous correction of INS errors with GNSS measurements enables full vehicle orientation to be determined even in case of single-antenna GNSS receiver. When INS is multiplexed with a dual-antenna GNSS system, INS measurements make it possible to permanently determine a rotation angle about the baseline which is impossible for a single dual-antenna system.

A key element of INS is the use of a well-known inertial measuring module (IMU). An IMU consists of a set of inertial sensors (e.g., gyros and accelerometers) rigidly fixed to a common base. A three-dimensional vector basis called an IMU Measurement frame (MF) is associated with the common base and the sensitivity axes of the separate sensors have a constant orientation relative to the MF. As will be understood, the coordinates, velocity vector components, and orientation measured by the INS are MF origin coordinates, MF origin velocity components and MF axes orientation, respectively.

In order to successfully multiplex the INS and GNSS receiver, the antenna's PC coordinates relative to MF should be equal to the pre-set values over the whole period of servicing of the multiplexed system. Further, the origin of MF coordinates needs to be as close to the antenna element's PC as possible. For example, an arrangement having the IMU inside the antenna housing typically satisfies these requirements, and PC coordinates with respect to MF origin can be determined at the design stage of a combined housing for the IMU and antenna.

If any information about physical parameters in proximity to the PC is used in the algorithms of the receiver, sensors of these parameters may be also located inside of the antenna housing. An example of such sensors are magnetic field vector component sensors or atmospheric sensors which measure pressure, humidity level, and ambient temperature directly at the point of receiving a GNSS signal.

In a GNSS navigation system in which the GNSS antenna and GNSS receiver are single modules connected by a RF cable, the distance between the antenna and receiver is limited by signal fading within the RF cable itself and having a range in the area of a few tens of meters. To use measurements from antenna sensors in signal processing algorithms, they need to be sent from the antenna to the receiver, and the measurements taken from all the antenna sensors need to be related to the receiver's time scale (i.e., the same time scale as that of the operating algorithms). This typically requires the transmission of a synchronization signal from the GNSS receiver to the GNSS antenna which can bind the moments of sampling of sensors and receivers in terms of the applicable time scale.

Processing a navigational signal received by a GNSS antenna necessarily requires the consideration of various antenna characteristics. As such, a single GNSS receiver capable of connecting different type antennas needs to determine antenna type and obtain numerical values of antenna parameters. This may be facilitated by reading, just after the antenna has been connected, such numerical values from a memory (e.g., non-volatile memory) resident inside the antenna. In addition, a receiver's firmware must have the capability of adjusting/reprogramming sensors and/or the non-volatile memory module inside the antenna. This means that a two-way information transfer channel is required between the antenna and receiver.

One solution of addressing two-way data exchange between an antenna and receiver is employing an additional cable through which the information is transmitted according to any well-known digital communication protocol. In this case, the antenna and receiver are connected by two cables: one RF cable to transmit GNSS signals and another cable to transmit information, with additional connectors serving to connect the respective communication links to the antenna and receiver housings. If the antenna and receiver are used within an existing cable network (e.g., a built-in RF-cable network as installed by the original manufacturer of a particular transportation means, for example, a car, airplane or boat), such an approach will require extra cable work which is not always possible or practical.

Alternatively, two-way communication between the antenna and receiver is provided using signals whose spectrum is concentrated in the low-frequency portion (i.e., from 0 Hz up to 5 MHz), which is considerably lower than the GNSS spectrum in the range of 1.2 GHz-1.5 GHZ. Such a difference in characteristic frequencies allows for a simple division of GNSS signals and the signals from sensors with the help of well-known frequency-selective techniques in the field of radio engineering. In this way, the two-way data communication between antenna sensors and the navigation receiver can be made through the same RF cable as that of the transmission of the received GNSS signal from the antenna element to the receiver RF path. The use of a common RF cable allows for the use of the available cable network to connect the antenna and receiver and eliminates any possible complication in the mechanical design of the antenna housing due to additional cabling/connectors, for example.

There are a number of known GNSS antenna configurations utilizing additional sensors, non-volatile memory and other additional information sources/receivers inside the antenna. For example, U.S. Pat. No. 8,446,984 to T. Kelin et al. describes a method of transmitting configuration parameters from a GNSS antenna via a RF cable using additional amplitude modulation of the GNSS signal as transmitted from the antenna module to the receiver. Signal demodulation and extraction of configuration data are performed in the receiver in the background mode during routine automatic gain control (AGC) operations. This technique does not require additional hardware blocks or special cable transceivers to receive and demodulate the additional signal. However, a potential drawback of this solution is principally a low communication rate, and the communication channel operates in one direction (i.e., from GNSS antenna to GNSS receiver).

United States Patent Publication No. 2011/0285584 to H. Le Sage describes a measuring system comprising different sensors integrated into a telecommunication antenna. Information from the sensors is transmitted to external users through a single cable. A main disadvantage of this method is the availability of the additional cable resulting in complicating the cabling system and adding extra mechanical connectors to the antenna and receiver, respectively.

U.S. Pat. No. 7,212,921 to M. Jeerage describes a satellite navigation system wherein a measuring unit consisting of a combined GNSS antenna module and IMU is connected to a remote GNSS receiver via a single RF cable. The GNSS signal and IMU measurements are transmitted to the receiver via a single RF cable. The antenna's low noise amplifier (LNA) and IMU are powered from the receiver through the same cable, and the power voltage, GNSS signal, and IMU signal differ in frequency and can be separated by a system of filters.

Chinese Patent Application No. CN 101765787 describes an ultra-tightly coupled GNSS-IMU system comprising an integrated antenna with built-in IMU. One potential drawback of this system is the additional cable to transmit measurements from the IMU to the remote GNSS receiver.

Chinese Patent Application No. CN 102590842 describes an integrated antenna configuration with built-in IMU which includes a transmission of GNSS signal, IMU measurements and IMU power supply through the same RF cable. In this antenna configuration, the IMU signal is modulated for transmission together with the GNSS signal through the RF cable.

As mentioned above, the above-described techniques have certain inefficiencies, for example, with respect to a lack of a channel to transmit data from the GNSS receiver to the GNSS antenna. As such, this makes any synchronization of IMU measurements with the receiver's time scale, as well as, updating of firmware (FW) inside a digital controlling device (which collects data from the IMU sensors) nearly impossible to achieve in any efficient manner.

Therefore, a need exists for an improved GNSS antenna having an integrated antenna element in combination with a plurality of built-in sources and/or receivers of additional information for exchanging the information and transmission of GNSS signals from the antenna element to a receiver over a single RF cable.

BRIEF SUMMARY OF THE EMBODIMENTS

In accordance with various embodiments, an improved GNSS antenna is provided having an integrated antenna element in combination with a plurality of built-in sources of additional information and/or a plurality of devices for receiving additional information (i.e., receivers of additional information) for exchanging the information and transmission of GNSS signals from the antenna element to a GNSS receiver over a single RF cable. As such, "additional information", in accordance with the embodiments herein, is information from these various different (and independent) sources (e.g., sensors, memory, other devices, etc.) and this additional information is distinguishable from the so-called "main information" available from the antenna element of GNSS antenna in the normal course of operation. That is, the GNSS may have built-in sources that provide additional information (e.g., temperature or pressure sensors, or stored information from a memory device) and/or devices that receive additional information (e.g., received and stored to a memory device) wherein the additional information is of the type that is associated with the ambient conditions or physical properties, for example, in which the GNSS antenna (or other associated components) is operating in (or subject to) and which may influence such operation or other characteristics thereof.

In accordance with an embodiment, an integrated GNSS antenna is provided comprising an antenna module to receive signals from one or more GNSS satellites in combination with a plurality of built-in sources and/or receivers of additional information for exchanging the information and transmission of GNSS signals from the antenna element to a receiver over a single RF cable. The plurality of built-in sources/receivers may be tightly fixed to the antenna housing or affixed internally within the antenna's housing. Further, the plurality of sources and/or receivers are, respectively, connected to a digital controlling device (e.g., microcontroller, field programmable gate array (FPGA), or application specific integrated circuit (ASIC), to name just few) which adjusts the sources/receivers and provides for an information exchange with users of the antenna device.

In accordance with an embodiment, two-way communication between the integrated antenna and an external location (defined by the location of a user and/or a remote GNSS receiver), is implemented via the same RF cable responsible for transmitting GNSS signals from the antenna module to the external location (e.g., the user). Electronic blocks within the integrated antenna (e.g., LNA, digital controlling device connection circuits, etc.) are also powered through the same RF cable. To implement the two-way data exchange via the RF cable, two specially configured cable transceivers are installed, illustratively, at the opposite ends of the RF cable, in particular, one inside the antenna (i.e., a first transceiver) and the other in the remote receiver (i.e., a second transceiver).

The antenna's transceiver (i.e., the first transceiver) receives digital data from the digital controlling device (to which the sources/receivers of additional information are connected), converts them into an analog signal for further transmission to the remote GNSS receiver via the RF cable. In turn, the antenna's transceiver receives analog signals transmitted through the RF cable from the remote GNSS receiver. The received analog signals are decoded into digital synchronization signals and/or digital packets with commands and/or data further transmitted to the digital controlling device that controls the plurality of sources and receivers (i.e., collectively, the additional information source(s)). The synchronized signals are used by the controller to tie requests to particular ones of the sources and/or receivers to the time scale of the external location (e.g., the user and/or a remote GNSS receiver). The packets with commands and data are used by the digital controlling device to control the operation mode of the sources/receivers and/or to update the FW version inside the digital controlling device.

The receiver's transceiver (i.e., the second transceiver) receives analog information as transmitted by the antenna's transceiver via the RF cable, converts such analog information into digital data for further delivery to a computational unit of the GNSS receiver through a digital interface for use with certain well-known navigation algorithms. This transceiver also receives digital synchronization signals and digital packets with commands and/or data from the GNSS receiver's computation unit, and converts such commands and/or data into an analog signal and for transmission to the remote integrated antenna via the RF cable.

In accordance with the embodiment, analog signals are generated by both transceivers (as connected to the opposite ends of the RF cable) and are concentrated in the low-frequency band area as contrasted with the higher frequency band/spectrum area of GNSS signals. Splitting of the GNSS signal (as directed from the antenna to the GNSS receiver), the power supply signal of the integrated antenna (from the GNSS receiver to the antenna) and the analog communication signal (i.e., the two-way communications signal) is implemented by well-known frequency-selective reception techniques. If the low-frequency analog spectra transmitted from the GNSS receiver to the antenna and from the antenna to the GNSS receiver, respectively, overlap then the information exchange between the antenna and the GNSS receiver is made via a half-duplex mode. Alternatively, if the spectra of these signals does not overlap and the attenuated low-frequency signal received from the remote transceiver can be isolated against the strong low-frequency signal transmitted by the transceiver, then the information exchange between the antenna and the GNSS receiver can be made in a full duplex mode.

In accordance with a further embodiment, the integrated GNSS antenna has one or more atmospheric sensors for measuring pressure, humidity and/or ambient temperature directly at the antenna location thereby providing further sources of additional information. To facilitate the necessary contact of the sensor elements with the surrounding environment (e.g., ambient air), in accordance with this embodiment, the antenna's housing is provided with one or more openings.

In accordance with a further embodiment, the integrated antenna utilizes one or more inertial sensors for measuring angular velocity vector components and antenna specific acceleration vector components. Further, in accordance with this embodiment, a random combination of different sensors are connected such that their measurements are read by the digital controlling device synchronously in the remote GNSS receiver's time scale.

In addition to the set of sensors measuring physical parameters as detailed above, in accordance with an embodiment, the antenna may also contain a non-volatile memory (e.g., reprogrammed or once-programmed memory) where certain data configurations are available (for example, serial antenna number, antenna type, sensor nomenclature, sensor coordinates relative to antenna PC, etc.) and/or the retention of characteristic operating parameters of the given antenna unit and its set of sensors as a result of factory calibration. In accordance with the embodiment, non-volatile memory modules are connected to the same digital controlling device as the sensors and can be read or re-written according to commands from a remote GNSS receiver which is asynchronous with the GNSS receiver's time scale.

These and other advantages of the embodiments will be apparent to those of ordinary skill in the art by reference to the following detailed description and the accompanying drawings.

DETAILED DESCRIPTION

In accordance with various embodiments, an improved GNSS antenna is provided having an integrated antenna element in combination with a plurality of built-in sources and receivers of additional information for exchanging the information and transmission of GNSS signals from the antenna element to a GNSS receiver over a single RF cable. As noted previously, the additional information, in accordance with the embodiments, is information from these various different (and independent) sources (e.g., sensors, memory, other devices, etc.) and this additional information is distinguishable from the main information available from the antenna element of GNSS antenna in the normal course of operation. That is, the GNSS may have built-in sources that provide additional information (e.g., temperature or pressure sensors, or stored information from a memory device) and/or devices that receive additional information (e.g., received and stored to a memory device) wherein the additional information is of the type that is associated with the ambient conditions or physical properties, for example, in which the GNSS antenna (or other associated components) is operating in (or subject to) and which may influence such operation or other characteristics thereof.

Figure 1A:
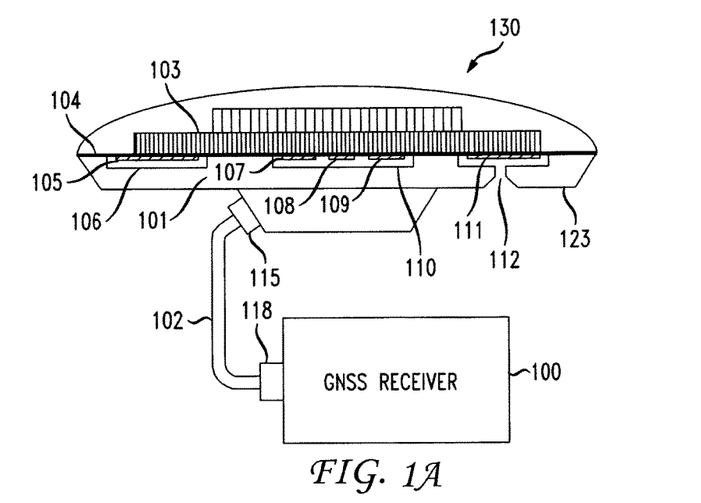
FIG. 1A is a system diagram illustrating the transmission of additional information from an integrated GNSS antenna to a remote GNSS receiver via a RF cable in accordance with an embodiment.
Figure 1B:
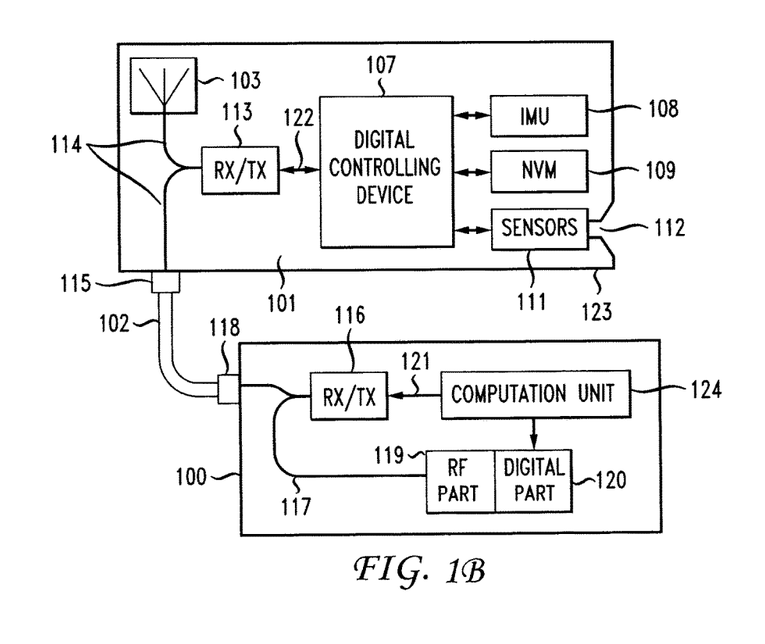
FIG. 1B is a functional block diagram of the GNSS receiver and GNSS antenna, respectively, as shown in FIG. 1A in accordance with an embodiment.

FIG. 1A is a system diagram illustrating the transmission of additional information from an integrated GNSS antenna to a remote GNSS receiver via a RF cable in accordance with an embodiment. FIG. 1B is a functional block diagram of the GNSS receiver and GNSS antenna, respectively, as shown in FIG. 1A in accordance with an embodiment. For ease of discussion and understanding of the embodiments, these figures will be now be discussed together.

As shown, navigation system 130 comprises a separate remote GNSS receiver 100 and an integrated GNSS antenna 101 with a plurality of sources (e.g., sensors 108 and 111, and non-volatile memory 109) of additional information being exchanged with GNNS receiver 100 through RF cable 102. Via this same cable (i.e., RF cable 102), a GNSS signal received by antenna element 103 is transmitted from GNSS antenna 101 to GNSS receiver 100, and a direct voltage is supplied to the electronic blocks of the integrated antenna (i.e., from GNSS receiver 100 to GNSS antenna 101).

Using ground plane 104, antenna element 103 is separated from the surface upon which the electronic blocks are mounted. A low-noise amplifier (LNA) 105 is protected by shield 106, and digital controlling device 107, a set of IMU sensors 108, non-volatile memory 109 are all protected by shield 110 (which is separate therefrom). A set of sensors 111 are provided (such sensors being of one single type or a variety of different sensor types) and can be electronic blocks of the integrated antenna. If certain sensitive elements of the set of sensors 111 need a direct contact with environment, such a contact can be provided by one or more orifices 112 cut into housing 123 of integrated GNSS antenna 101.

Digital controlling device 107 (e.g., a microcontroller, FPGA, ASIC, or similar type of device) reads information from sensors 108, 111 and/or from nonvolatile memory 109 and transmits the information through digital interface 122 in the antenna's transceiver 113. The information read from these sensors and/or memory, for example, is the additional information which, in accordance with the embodiments, is information that is distinguishable from (and different than) the main information available from antenna element 103 of GNSS antenna 101 in the normal course of operation. Transceiver 113 converts the digital data from digital controlling device 107 into an analog signal which is further transmitted in remote GNSS receiver 100 via RF cable 102. Transceiver 113 also receives the analog signal from remote GNSS receiver 100 and converts the analog signal into digital data for further delivery to digital controlling device 107. Such received data can be, for example, a sensor's enquiry signals synchronized with the time scale associated with GNSS receiver 100, integrated antenna control commands, data read commands to obtain integrated antenna status, FW updating commands associated with digital controlling device 107, to name just a few data types. Transceiver 113 is connected to internal RF cable 114 coupled to antenna element 103 with external RF connector 115 on the housing of the GNSS antenna 101.

Inside GNSS receiver 100 there is computation unit 124 coupled to transceiver 116 which is connected to internal RF cable 117 switching RF connector 118 of the receiver's housing (to which RF cable 102 is connected) to the input of RF part 119 of GNSS receiver 100. The GNSS receiver's transceiver (i.e., transceiver 116) converts a digital signal from digital part 120 of GNSS receiver 100 via two-way digital interface 121 into an analog signal further delivered via RF cable 102. The GNSS receiver's transceiver (i.e., transceiver 116) also receives the analog signal transmitted by antenna's transceiver 113 from RF cable 102, and converts the analog signal into a digital signal for delivery to digital part 120 through digital interface 121.

Figure 2:
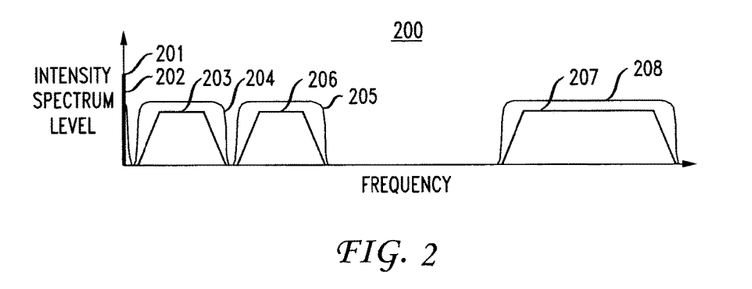
FIG. 2 is a graph of the relative position of spectra of an antenna power signal, and a communication signal between a GNSS antenna and a GNSS receiver in accordance with an embodiment.

There are three signals present in RF cable 102 during operation of navigation system 130: (i) the direct voltage to supply of the remote antenna, (ii) the analog signal exchanged between the antenna (e.g., GNSS antenna 101) and receiver (e.g., GNSS receiver), and (iii) a GNSS signal. The relative location of the spectra of these signals is shown in FIG. 2 which is a graph of the relative position of spectra of an antenna power signal, and communication signal between an antenna and a GNSS receiver in accordance with an embodiment. The spectrum 201 of the direct voltage signal transmitted from the GNSS receiver 100 to GNSS antenna 101 lies on the frequency of 0 Hz. This signal is separated in GNSS antenna 101 by a narrow-band low-frequency filter with, for example, amplitude-frequency characteristic (AFC) 202 as shown in graph 200 of FIG. 2.

Spectrum 203 of the analog signal is transmitted by the antenna's transceiver 113 and spectrum 206 of the analog signal transmitted by GNSS receiver's transceiver 116 are concentrated in the low-frequency area without signal overlapping on the frequency of 0 Hz occupied by direct voltage signal 201. The antenna's transceiver signal with spectrum 203 is isolated by the receiver's transceiver 116 by a bandpass filter having AFC 204, for example. The antenna transceiver signal 116 with spectrum 206 is isolated by the antenna's transceiver 113 by a bandpass filter having AFC 205, for example.

Spectra 203 and 206 can be randomly located on the frequency axis relative to each other. If spectra 203 and 206, respectively, do not overlap and bandpass filters having AFC 204 and 205, respectively, can isolate the weakened received signal due to suppressing its own transmitted signal, a two-way data exchange between GNSS receiver 100 and GNSS antenna 101 can be accomplished in a full duplex mode. Otherwise, if spectra 203 and 206 overlap or the bandpass filter of the receiving transceiver cannot suppress its own transmitted signal, the two-way data exchange between GNSS antenna 101 and GNSS receiver 100 is implemented in a half-duplex mode. Further, GNSS spectrum 207 transmitted from GNSS antenna 101 to GNSS receiver 100 is considerably distant from the low-frequency area occupied by spectra 201, 203, 206, respectively. This signal is isolated in RE-part 119 of GNSS receiver 100 using a bandpass filter having AFC 208, for example.

Figure 3:
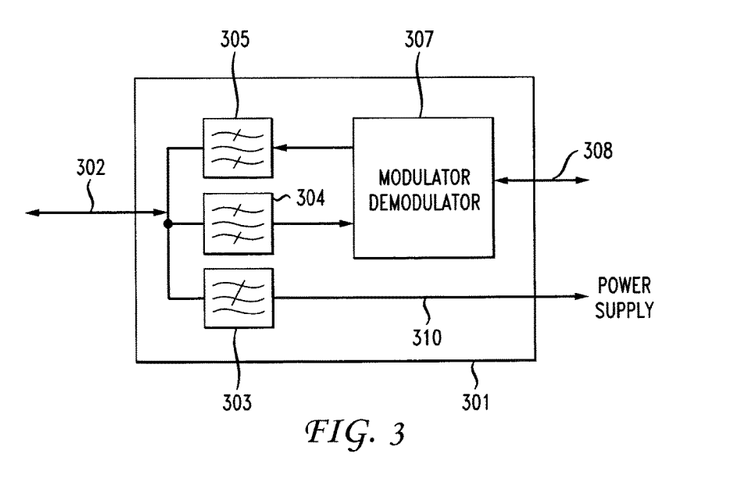
FIG. 3 is a functional block diagram of a cable transceiver in accordance with an embodiment.

FIG. 3 is a functional block diagram of a cable transceiver in accordance with an embodiment. As shown, cable transceiver 301 can be configured as antenna's transceiver 113 or receiver's transceiver 116 by selecting the corresponding firmware/software settings. Transceiver 301 is switched to RF cable 302 which in turn is RF cable 114 (as shown in FIG. 1B), if the settings of transceiver 301 correspond to the specification of transceiver 113, or which in turn is RF cable 117 (as shown in FIG. 1B), if the settings of transceiver 301 match the specification of transceiver 116. The direct voltage signal transmitted via RF cable 302 is separated in transceiver 301 using a narrow-band low-frequency filter 303 having AFC 202, for example. This signal is used to power electronic blocks (via power supply 310) inside integrated GNSS antenna 101. When transceiver 301 is configured according to the specification of transceiver 116, this signal is turned off.

Reception of the analog data exchange signal from RF cable 302 is accomplished via receiving bandpass filter 304. The analog data exchange signal is transmitted to RF cable 302 from the output of a generating bandpass filter 305. If transceiver 301 is adjusted according to the specification of the antenna's transceiver 113, the bandpass filter 304 will have AFC 205, for example, and bandpass filter 305 will have AFC 203, for example. If transceiver 301 is adjusted according to the specification of the receiver's transceiver 116, then bandpass filter 304 will have AFC 204, for example, and bandpass filter 305 will have AFC 206, for example.

Modulator/demodulator 307 receives a filtered analog signal from the output of bandpass filter 304, extracts the received information from such filtered analog signal which is further transmitted to the user via data exchange digital interface 308. The modulator/demodulator 307 also receives digital information from interface 308 and converts such digital information into an analog signal whose spectrum is coordinated with generating filter 305. Once the analog signal has been converted, it is delivered to the input of filter 305, and from its output it is delivered to RF cable 302. If transceiver 301 matches the specification of the transceiver 113, then digital interface 308 corresponds to digital interface 122. If transceiver 301 matches the specification of transceiver 116, then digital interface 308 corresponds to digital interface 121.

Figure 4:
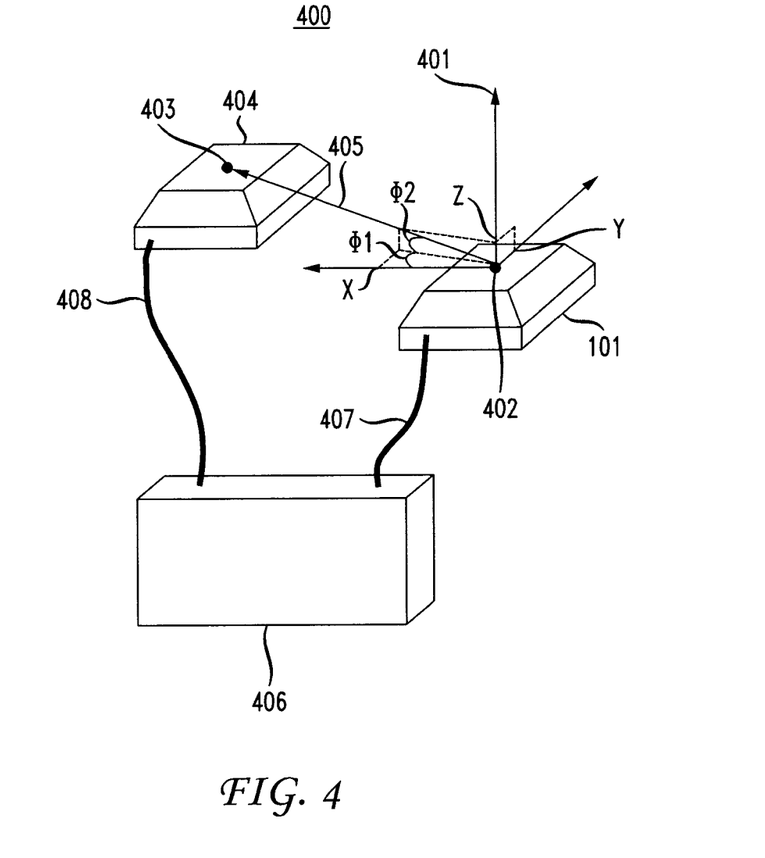
FIG. 4 is a diagram showing an integrated antenna for a dual-antenna positioning system in accordance with an embodiment.

FIG. 4 is a diagram 400 showing an integrated antenna for a dual-antenna positioning system in accordance with an embodiment. Integrated GNSS antenna 101 has IMU 108 which operates within dual-antenna navigation system 130 (see also, FIG. 1). Measurements of angular velocity vector and specific acceleration vector made by IMU sensors are brought to the corresponding orthogonal Measurement Frame 401 which is tightly coupled to the housing of GNSS antenna 101. For the sake of clarity, the origin of MF coordinates is in PC 402 of GNSS antenna 101. Phase center 403 of a second GNSS antenna 404 is shifted by base vector 405 relative to phase center 402 of GNSS antenna 101 (i.e., the first antenna). As such, GNSS antennas 101 and 404 are connected to dual-antenna GNSS receiver 406 by RF cables 407 and 408, respectively. RF cable 407 is connected to an antenna connector of dual-antenna receiver 406 that is switched to the receiver's transceiver 116 inside of receiver 406.

After the dual-antenna system is installed onto the target platform in GNSS receiver 406, coordinates of base vector 405 drawn from PC 402 towards PC 403 are stored relative to MF 401. For example, Cartesian coordinates of vector (i.e., X, Y, Z coordinates) or spherical coordinates of its end (i.e., vector length D, angle $\phi1$, and angle $\phi2$) can serve as such coordinates. These coordinates can be used to coordinate measurements of IMU 108 with GNSS measurements of GNSS antennas 101 and 404 in multiplexing the inertial and satellite navigation systems in FW of dual-antenna receiver 406.

Figure 5:
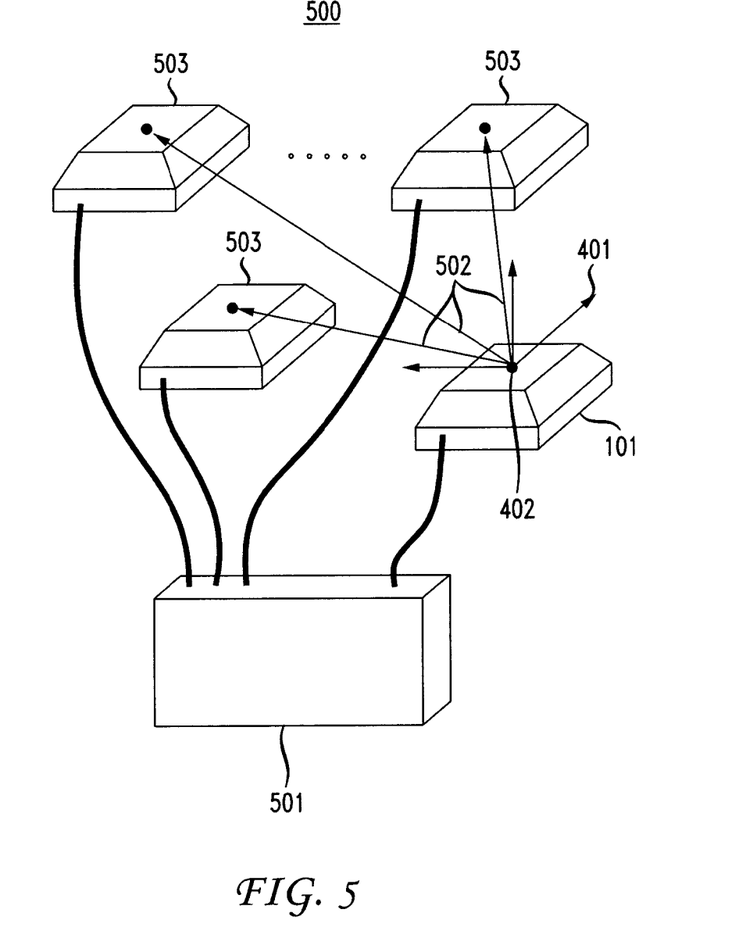
FIG. 5 is a diagram showing an integrated antenna for a multi-antenna positioning system in accordance with an embodiment.

FIG. 5 is a diagram 500 showing an integrated antenna for a multi-antenna positioning system in accordance with an embodiment. As shown, the diagram is of the illustrative operation of integrated GNSS antenna 101 in a multi-antenna system wherein the total number of GNSS antennas is greater than or equal to NW. In such a system integrated GNSS antenna 101 is connected to an antenna connector of multi-antenna receiver 501 to which the receiver's transceiver 116 is switched. After such a system is installed onto the target platform in GNSS receiver 501, coordinates of all base vectors 502 drawn from PC 402 of integrated GNSS antenna 101 towards phase centers of each N−1 additional GNSS antennas 503. These coordinates are used to coordinate measurements of IMU 108 with GNSS measurements of integrated GNSS antenna 101 and N−1 additional GNSS antennas 503 when the inertial and satellite navigational systems are multiplexed in FW of multi-antenna receiver 501.

Figure 6:
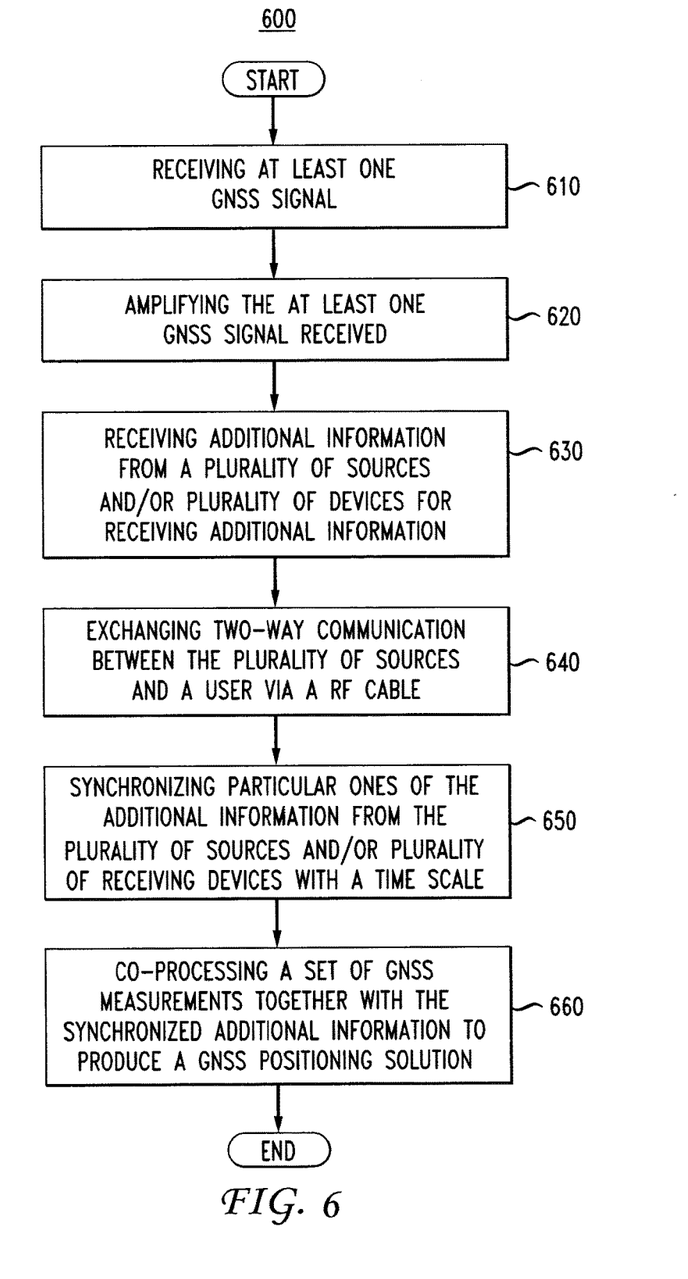
FIG. 6 shows a flowchart of illustrative operations for a GNSS antenna configured in accordance with an embodiment.

FIG. 6 shows a flowchart of illustrative operations 600 for a GNSS antenna configured in accordance with an embodiment. In particular, receiving at least one GNSS signal at step 610, amplifying the at least one GNSS signal at step 620, and receiving additional information from a plurality of sources and/or a plurality of devices for receiving additional information at step 630, as detailed herein above. In particular, the additional information, in accordance with the embodiment, from these various different (and independent) sources (e.g., sensors, memory, other devices, etc.) is distinguishable from (and different than) the main information available from the antenna element of GNSS antenna in the normal course of operation. Further, at step 640, exchanging a two-way communication between the plurality of sources and a receiver (and corresponding user thereof) via an RF cable, and synchronizing, with a specific time scale, particular ones of the additional information from the plurality of sources and/or the plurality of receiving devices at step 650. At step 660, co-processing a set of GNSS measurements together with the synchronized additional information to produce a GNSS positioning solution. As such, the aforementioned operations are such that the GNSS antenna may have built-in sources that provide additional information (e.g., temperature or pressure sensors, or stored information from a memory device) and/or devices that receive additional information (e.g., received and stored to a memory device) wherein the additional information is of the type that is associated with the ambient conditions or physical properties, for example, in which the GNSS antenna (or other associated components) is operating in (or subject to) and which may influence such operation or other characteristics thereof.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A GNSS antenna comprising:
    an antenna module for receiving a GNSS signal;
    an amplifier for amplifying the GNSS signal;
    a plurality of sources of additional information;
    a radio frequency (RF) cable;
    a transceiver for providing two-way data communication, using the RF cable, between particular ones of the sources of additional information and at least one location external to the GNSS antenna; and
    a digital controlling device for synchronizing particular ones of the additional information with a time scale associated with the at least one external location by exchanging the particular ones of the additional information via the RF cable and the transceiver.

2. The GNSS antenna of claim 1 wherein the plurality of sources includes at least one inertial sensor, the inertial sensor measuring at least one of an acceleration vector and an angular velocity vector.

3. The GNSS antenna of claim 2 wherein the plurality of sources includes at least one atmospheric sensor, the atmospheric sensor measuring at least one of a pressure, a humidity level, and an ambient temperature at a point of receiving the GNSS signal.

4. The GNSS antenna of claim 3 wherein the plurality of sources include at least one magnetic sensor, the magnetic sensor measuring at least one magnetic field vector.

5. The GNSS antenna of claim 3, further comprising:
    a housing having at least one orifice therein for providing a contact area between the atmospheric sensor and an external environment surrounding the GNSS antenna.

6. The GNSS antenna of claim 1 wherein the plurality of sources includes a non-volatile memory.

7. The GNSS antenna of claim 1 further comprising:
    a plurality of devices for receiving the additional information.

8. The GNSS antenna of claim 6 wherein the non-volatile memory stores a set of operating parameters for the GNSS antenna.

9. The GNSS antenna of claim 1 wherein the two-way data communication is a full duplex mode communication.

10. The GNSS antenna of claim 1 wherein the two-way data communication is a half-duplex communication.

11. A navigation system comprising:
    at least one GNSS antenna, the at least one GNSS antenna comprising:
        an antenna module for receiving a GNSS signal;
        an amplifier for amplifying the GNSS signal;
        a plurality of sources of additional information;
        a first transceiver for providing two-way data communication between particular ones of the sources of the additional information and at least one location external to the GNSS antenna;
        a radio frequency (RF) cable; and
        a digital controlling device for synchronizing particular ones of the additional information with a time scale associated with the at least one external location by exchanging the particular ones of the additional information via the RF cable and the first transceiver;
    a GNSS receiver having a second transceiver for transmitting and receiving particular other ones of the additional information across the RF cable, the receiving of the particular other ones of the additional information occurring simultaneously with the receiving of the GNSS signal across the RF cable; and
    a computation unit for co-processing a plurality of GNSS measurements received by the navigation system together with the additional information from the plurality of sources associated with the GNSS antenna.

12. The navigation system of claim 11 wherein the co-processing of the plurality of GNSS measurements together with the additional information results in identifying a specific GNSS position.

13. The navigation system of claim 11 wherein the plurality of sources includes at least one inertial sensor, the inertial sensor measuring at least one of an acceleration vector and an angular velocity vector.

14. The navigation system of claim 13 wherein the plurality of sources includes at least one atmospheric sensor, the atmospheric sensor measuring at least one of a pressure, a humidity level, and an ambient temperature at a point of receiving the GNSS signal.

15. The navigation system of claim 11 wherein the first transceiver and the second transceiver are in two-way communication across the RF cable.

16. The navigation system of claim 14 wherein the plurality of sources includes at least one magnetic sensor, the magnetic sensor measuring at least one magnetic field vector.

17. The navigation system of claim 14 wherein the GNSS antenna further comprises:
a housing having at least one orifice therein for providing a contact area between the atmospheric sensor and an external environment surrounding the GNSS antenna.

18. The navigation system of 11 further comprising:
a plurality of devices for receiving the additional information.

19. The navigation system of claim 11 wherein the GNSS antenna further comprises:
a non-volatile memory for storing at least a set of operating parameters for the GNSS antenna.

20. The navigation system of claim 11 wherein the RF cable is used to exchange a direct voltage signal, an analog signal, and a GNSS signal.

21. The navigation system of claim 11 wherein the navigation system includes a plurality of GNSS antennas and particular ones of the GNSS antennas being configured substantially the same as the at least one GNSS antenna.

22. A GNSS navigation method comprising:
receiving a GNSS signal by a GNSS antenna;
amplifying the GNSS signal;
receiving additional information from a plurality of sources;
exchanging two-way communication, using an RF cable, between the plurality of sources of additional information and at least one location external to the GNSS antenna;
synchronizing particular ones of the additional information with a time scale associated with the at least one location external to the GNSS antenna; and
co-processing a set of GNSS measurements together with the synchronized particular ones of the additional information to produce a specific GNSS position.

23. The GNSS navigation method of claim 22 further comprising:
receiving the additional information from at least one location external to the GNSS antenna; and
storing the additional information from the at least one location in a memory associated with the GNSS antenna.

24. The GNSS navigation method of claim 22 further comprising:
measuring, using an atmospheric sensor, at least one of a pressure, a humidity level, and an ambient temperature at a point of receiving the GNSS signal, the atmospheric sensor being a particular one source of the plurality of sources.

25. The GNSS navigation method of claim 22 further comprising:
measuring, using an inertial sensor, at least one of an acceleration vector and an angular velocity vector, the inertial sensor being a particular one source of the plurality of sources.

26. The GNSS navigation method of claim 22 further comprising:
storing a set of operating parameters for the GNSS antenna in a memory.

27. The GNSS navigation method of claim 22 further comprising:
measuring, using a magnetic sensor, at least one magnetic field vector, the magnetic sensor being a particular one source of the plurality of sources.

* * * * *